United States Patent Office 3,704,258
Patented Nov. 28, 1972

3,704,258
ENOL ETHER INTERMEDIATES FOR JUVENILE
HORMONES AND ANALOGS
Clive A. Henrick and John B. Siddall, Palo Alto, Calif.,
assignors to Zoecon Corporation, Palo Alto, Calif.
No Drawing. Filed Sept. 18, 1970, Ser. No. 73,599
Int. Cl. C07c 69/66; A01n 9/24
U.S. Cl. 260—410.9 R
9 Claims

ABSTRACT OF THE DISCLOSURE

Stereospecific syntheses of the natural juvenile hormones and analogs and novel intermediates.

---

This invention relates to novel stereospecific syntheses of natural juvenile hormones and analogs thereof and novel intermediates.

Juvenile hormone has been isolated from the adult male *Hylaphora cecropia*, the silkworm moth. The first juvenile hormone was identified as trans, trans, cis methyl 10,11-oxido-3,11-dimethyl - 7 - ethyltrideca-2,6-dienoate. Roeller et al., Angew. Chem. 79, 190 (1967) and Dahm et al., J. Amer. Chem. Soc. 89, 5292 (1967). A second juvenile hormone was identified as trans, trans, cis methyl 10,11 - oxido-3,7,11-trimethyltrideca-2,6-dienoate. Meyer et al., Proc. Nat. Acad. Sci. U.S. 60, 853 (1968).

Natural juvenile hormones and analogs are useful for the control of insects through interference with metamorphosis. Studies indicate the need for trans configuration at positions C-2,3 and C-6,7 for maximum activity. Dahm et al., Life Sciences 7, No. 4, 129 (1968).

The present invention provides novel syntheses for the preparation of a key intermediate (VI) having trans configuration at positions C-2,3 and C-6,7. The halo ketone (VI) is an excellent intermediate for the preparation of the natural juvenile hormones and analogs thereof (VII) using the procedure of Johnson et al., Proc. Nat. Acad. Sci. U.S. 62, No. 4, 1005 (April 1969).

The novel syntheses of the present invention can be illustrated as follows:

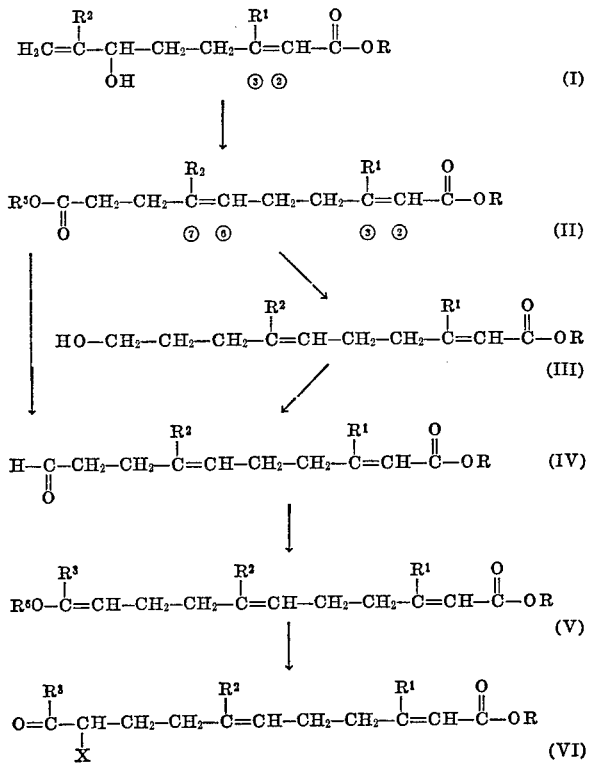

In the foregoing formulas, R is lower alkyl, cycloalkyl, aralkyl or aryl; each of $R^1$, $R^2$, $R^3$, $R^5$, and $R^6$ is lower alkyl; and X is bromo or chloro.

In the practice of the above-outlined syntheses, an allylic alcohol (I) is converted into a diester of Formula II having trans configuration at C-6,7 by Claissen rearrangement using lower alkyl orthoacetate, $CH_3C(OR^5)_3$, in the presence of a weak acid catalyst. The allylic alcohol (I) preferably has trans configuration at C-2,3 or predominantly trans in case of a trans and cis mixture. An equivalent amount or greater of orthoacetate is used, generally an excess, such as two or more moles of orthoacetate per mole of allylic alcohol. Completion of the reaction within a convenient time is favored by continuous removal of the alcohol formed during the reaction. The reaction is conducted above room temperature, such as from about 60° C. to about 140° C., generally from about 90° C. to about 110° C. The most advantageous temperature is dependent upon the particular reactants and the weak acid catalyst. It is not necessary to include an organic solvent medium but organic solvents inert to the reaction can be employed. The weak acid catalyst is employed in only trace amounts. Weak organic acids, such as acetic acid, propionic acid and 2,4-dinitrophenol, are suitable. Preferably, the reaction is conducted under inert atmosphere, such as nitrogen or argon. Provided with the foregoing and the examples hereinafter, the most advantageous conditions for particular reactants are determinable by routine experimentation. Claissen rearrangement as applied to the syntheses of all-trans squalene is described by Johnson et al., J. Amer. Chem. Soc. 92, 741 (Feb. 11, 1970).

The diester (II) is converted into the aldehyde (IV) directly by reaction with di-isobutylaluminum hydride or by selective reduction to the alcohol (III) followed by oxidation. Direct conversion is accomplished by treatment of the diester (II) with one equivalent of di-isobutylaluminum hydride at low temperature of the order of 0° C. to —100° C., preferably about —20° C. to about —78° C., in an organic solvent inert to the reaction, such as an ether or a hydrocarbon, e.g. toluene, ether or hexane. Conversion of II to the alcohol (III) is accomplished by selective reduction using one-half mol of a conventional reducing agent, such as lithium aluminum hydride, or one mol of lithium diethoxyaluminum hydride, or sodium dihydro-bis-(2-methoxyethoxy)aluminate, per mol of diester, at low temperature of the order of 10° C. to —100° C., generally 0° C. to about —80° C., in organic solvent inert to the reaction, such as a hydrocarbon or ether solvent, e.g. benzene, ether, tetrahydrofuran, and the like. The alcohol (III) is then oxidized to the aldehyde (IV). The oxidation can be carried out using, for example, chromium trioxide-pyridine complex, e.g. Collins reagent [Tetrahedron Letters, 3363 (1968)], Jones reagent (chromium trioxide-aqueous sulfuric acid-acetone), dichromic acid in aqueous organic solvent, or chromic acid in aqueous organic solvent. Suitable organic solvents include acetone, ether, benzene and methylene chloride. Depending upon the particular oxidizing agent and solvent, the oxidation is carried out at from about —20° C. to about 100° C. For example, oxidation using chromium trioxide-pyridine complex in pyridine can be carried out from 0° C. to 100° C., usually room temperature, whereas when employing, e.g. methylene chloride, the reaction is preferably done at about 0° C. Using chromic acid and aqueous acid, such as sulfuric acid, in, e.g. acetone, the oxidation is preferably done at from about —10° C. to 30° C. The most advantageous temperature for a particular oxidizing system is easily determined by routine experimentation using the foregoing and the examples hereinafter as a guide.

The aldehyde (IV) is converted into the enol ether (V) by reaction with an ylid of the formula:

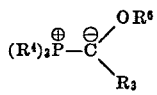

wherein $R^3$ and $R^6$ are lower alkyl and $R^4$ is aryl, aralkyl or cycloalkyl. The reaction is conducted at low temperatures of the order of about $-10°$ C. to about $-150°$ C., usually about $-30°$ C. to about $-90°$ C. in an organic solvent inert to the reaction, such as a hydrocarbon, ether or dialkylsulfoxide, e.g. benzene, toluene, ether, tetrahydrofuran, diglyme, monoglyme, dimethylsulfoxide, dimethylformamide, dioxane and mixtures thereof. An equivalent amount or more of the ylid is employed. The ylid is prepared from the corresponding phosphonium bromide or chloride by treatment with a base capable of removing hydrogen halide, such as butyllithium, phenyllithium, ethyllithium, methyllithium, and the like, in one of the aforementioned organic solvents. The phosphonium bromide or chloride is prepared by conventional methods using a tertiary phosphine and the halide:

$$\underset{H\quad R^3}{X-C{\overset{\displaystyle OR^6}{\diagup}}} \qquad (VIII)$$

at low temperature. See, for example, Coulsen, Tetrahedron Letters, No. 45, 3323 (1964) and Johnson, "Ylid Chemistry," Academic Press Inc., New York (1966). The halides (VIII) can be prepared by the procedure of Klages et al., Chem. Ber. 92, 1818 (1959) and Rubencamp, Ann. 225, 269 (1884).

The enol ether (V) is converted into the halo ketone (VI) using one equivalent or slight excess of N-chlorosuccinimide or N-bromosuccinimide in an aqueous organic solvent. The reaction is conducted in the presence of a buffer to remove strong acid to avoid rearrangement at a temperature of about 20° C. to about $-60°$ C., generally from 10° C. to $-40°$ C. The reaction is usually done in acetone although other organic solvents inert to the reaction can be used.

The halo ketone (VI) prepared according to the present invention is then reacted with the Grignard $R^7MgX$ in ether or tetrahydrofuran followed by treatment with base to yield the 2(trans), 6(trans)-diene ester (VII) having cis and trans configuration at C-10,11, predominantly cis. $R^7$ is lower alkyl and X is bromo or chloro.

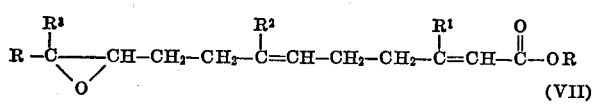

The allylic alcohols (I) can be prepared according to the procedure of Anderson et al., J. Amer. Chem. Soc. 92, 735 (1970), Johnson et al., J. Amer. Chem. Soc. 92, 4463 (July 1970) or copending U.S. application Ser. No. 7,987, filed Feb. 2, 1970, the disclosures of which are incorporated by reference.

The compounds of Formulas II and V in addition to their utility for the preparation of juvenile hormones and analogs thereof are versatile chemical intermediates for the preparation of and useful as perfumes, perfume additives, lubricants and additives therefor and insect control formulations. For example, the diester of Formula II ($R^1=R^2=$methyl) is a useful intermediate for the production of components of pheromones of *Danaus plexippus* and *Lyeorea ceres ceres* identified by Meinwald et al., Tetrahedron Letters, No. 47, 4893 (1968) and Chem. Commun. 3, 86 (1969), such as trans,trans 3,7-dimethyl-2,6-decadiene-1,10-dioic acid.

The term "lower alkyl," as used herein, refers to primary and secondary alkyl, straight or branched, of a chain length of one to six carbons. When "lower alkyl" is used in connection with the group represented by "R," it includes tertiary alkyl. The term "cycloalkyl," as used herein, refers to a cyclic alkyl group of four to eight carbon atoms. The term "aralkyl," as used herein, refers to a monovalent group of seven to twelve carbon atoms in which an aryl group is substituted for a hydrocarbon atom of an alkyl group, such as benzyl, xylyl, mesityl, phenylethyl, methylbenzyl, naphthylmethyl and naphthylethyl. The term "aryl," as used herein, refers to a monovalent aryl group of six to twelve carbons, such as phenyl and naphthyl.

The following examples are provided to illustrate the present invention. Temperature is given in degrees centigrade.

EXAMPLE 1

To a mixture of 17.8 g. of trans methyl 3-methyl-6-hydroxy-7-methylenenon-2-enoate and 73 g. of trimethyl orthoacetate under nitrogen is added 0.25 ml. of acetic acid. The reaction mixture is stirred at about 108° for three hours in continuous nitrogen stream with continuous removal of methanol by molecular sieve. The reaction mixture is allowed to cool to room temperature and then excess trimethyl orthoacetate is removed by heating under vacuum to yield trans,trans methyl 3-methyl-7-ethyl - 9 - carbomethoxynona - 2,6 - dienoate which can be further purified by distillation.

EXAMPLE 2

To 2 g. of the diester of Example 1 in 25 ml. of toluene under argon, cooled to $-78°$, is added with stirring 1.45 ml. of di-isobutylaluminum hydride over about 0.5 hour at $-78°$. The reaction mixture is stirred at $-78°$ for about 24 hours and then poured into ether containing dilute aqueous hydrochloric acid. The organic layer is washed with aqueous ammonium chloride and brine, dried and evaporated under reduced pressure to yield trans,trans methyl 3 - methyl - 7 - ethyl - 9 - carbonylnona-2,6-dienoate which can be further purified by chromatography.

EXAMPLE 3

To 21.55 g. of the diester of Example 1 in 100 ml. of tetrahydrofuran, under nitrogen, at about $-78°$ with stirring, is added 11.35 ml. of lithium aluminum hydride in ether (3.86M) over a period of about 0.75 hour. The reaction mixture is stirred at about $-78°$ for about 2.5 hours and then at 0° for two hours. The mixture is then poured into saturated sodium chloride acidified with aqueous hydrochloric acid followed by extraction with ether. The ethereal extract is washed with sodium chloride, water and sodium chloride dried over calcium sulfate and evaporated to yield trans,trans methyl 3-methyl-7 - ethyl - 10 - hydroxydeca - 2,6 - dienoate which can be further purified by chromatography on silica gel.

EXAMPLE 4

To a stirred mixture of 61.36 g. of dry chromium trioxide and 1500 ml. of methylene chloride, cooled in an ice-bath under nitrogen, is added 40 g. of calcium sulfate (8 mesh) and then 100 ml. of pyridine over five minutes. The mixture is stirred 20 minutes and then 24.17 g. of trans,trans methyl 3 - methyl - 7 - ethyl - 10 - hydroxydeca-2,6-dienoate in 100 ml. of methylene chloride is added over five minutes followed by stirring at ice-bath temperature for one hour and then at room temperature for one hour. The mixture is poured into aqueous saturated sodium bicarbonate to which is added rinsings with methylene chloride and aqueous sodium bicarbonate. This mixture is washed with cold aqueous potassium carbonate, water, aqueous hydrochloric acid and brine and dried over calcium sulfate. The mixture is concentrated, taken up in ether-pentane, filtered and evaporated to yield trans, trans methyl 3-methyl-7-ethyl-9-carbonylnona-2,6-dienoate.

EXAMPLE 5

(A) To 60 g. of phosphonium salt (prepared from triphenylphosphine and α-chloropropylmethyl ether in benzene at 5°) under nitrogen is added 450 ml. of dry tetrahydrofuran with stirring. After cooling to —78°, 100 ml. of n-butyllithium in hexane (1.59 M) is added over eight minutes with stirring. The reaction mixture is stirred at —78° for one hour and then 18.73 g. of the aldehyde (trans, trans methyl 3-methyl-7-ethyl-9-carbonylnona-2,6-dienoate) in 60 ml. of tetrahydrofuran is added followed by stirring at —78° for two hours. The mixture is allowed to stand overnight at —78° and then rise to 10°. Water (50 ml.) is added, stirred, left at room temperature for two hours and then poured into saturated sodium chloride-sodium bicarbonate followed by extraction with ether-hexane (2×). The combined extract is washed with sodium chloride-sodium bicarbonate, dried over calcium sulfate-potassium carbonate and concentrated. The concentrate is taken up in pentane and then evaporated under reduced pressure to yield the enol ether (trans, trans methyl 3 - methyl - 7 - ethyl - 11-methoxytrideca-2,6,10-trienoate).

(B) To a mixture of 30 g. of sodium acetate, 150 ml. of water and 400 ml. of acetone at 0° is added 30 g. of N-chlorosuccinimide with stirring. The enol ether of Part A (about 41.2 g.) in 100 ml. of acetone is then added over about 0.5 hour (bath temperature about —4° to —6°). The reaction mixture is stirred at —6° for about 0.75 hour and then 20 g. of sodium bisulfite in 100 ml. of water is added. After about five minutes, the mixture is diluted with saturated sodium chloride and then extracted with ether-pentane (2×). The combined extract is washed with sodium chloride, dried over calcium sulfate and evaporated to yield trans, trans methyl 3-methyl-7-ethyl-10-chloro-11-oxotrideca-2,6-dienoate which is purified by chromatography on deactivated silica gel eluting with benzene-ether mixtures. The ketone trans, trans methyl 3 - methyl - 7 - ethyl-11-oxotrideca-2,6-dienoate is isolated during chromatographic purification and represents from 5% to 15% of the reaction product.

The thus-obtained chloro ketone is converted into juvenile hormone by reaction with methylmagnesium chloride or bromide followed by treatment with base. See Johnson et al., Proc. Nat. Acad. Sci. 62, No. 4, 1005 (Apr. 15, 1969).

EXAMPLE 6

(A) The process of Example 1 is repeated using each of trans ethyl 3 - methyl - 6-hydroxy-7-methylenenon-2-enoate, trans methyl 3-methyl-6-hydroxy-7-methyleneoct-2-enoate and trans ethyl 3-methyl-6-hydroxy-7-methyleneoct-2-enoate as the starting material to yield each of trans, trans ethyl 3-methyl-7-ethyl-9-carbomethoxynona-2,6-dienoate, trans, trans methyl 3,7-dimethyl-9-carbomethoxynona-2,6-dienoate and trans, trans methyl 3,7-dimethyl-9-carbomethoxynona-2,6-dienoate.

Similarly, using the procedure of Example 1 with the exception of employing triethylorthoacetate, there is obtained trans, trans methyl 3-methyl-7-ethyl-9-carbethoxynona-2,6-dienoate, trans, trans ethyl 3-methyl-7-ethyl-9-carbethoxynona-2,6-dienoate, trans, trans methyl 3,7-dimethyl-9-carbethoxynona-2,6-dienoate and trans, trans ethyl 3,7-dimethyl-9-carbethoxynona-2,6-dienoate.

(B) The diesters of Part A are selectively reduced using the procedure of Example 3 to yield the corresponding mono-alcohol of Formula III, e.g. trans, trans ethyl 3-methyl-7-ethyl-10-hydroxydeca-2,6-dienoate, trans, trans methyl 3,7 - dimethyl - 10 - hydroxydeca-2,6-dienoate and trans, trans ethyl 3,7 - dimethyl - 10-hydroxydeca-2,6-dienoate are obtained from trans, trans ethyl 3-methyl-7-ethyl - 9 - carbomethoxynona - 2,6-dienoate, trans, trans methyl 3,7 - dimethyl - 9-carbomethoxynona-2,6-dienoate and trans, trans ethyl 3,7-dimethyl-9-carbomethoxynona-2,6-dienoate, respectively. The thus-obtained mono-hydroxy compounds are converted into the corresponding aldehyde of Formula IV by oxidation using the process of Example 4.

(C) The aldehydes of Part B are converted into the corresponding enol ethers (V) using the process of Example 5 (Part A), e.g. trans, trans ethyl 3-methyl-7-ethyl - 11 - methoxytrideca-2,6,10-trienoate, trans, trans methyl 3,7 - dimethyl - 11 - methoxytrideca - 2,6,10-trienoate, and trans, trans ethyl 3,7-dimethyl-11-methoxytrideca-2,6,10-trienoate, respectively.

Similarly, by repeating the procedure of Example 5 using α-chloropropylethyl ether in place of α-chloropropylmethyl ether, there is obtained trans, trans methyl 3-methyl-7-ethyl-11-ethoxytrideca-2,6,10-trienoate.

EXAMPLE 7

To 1 g. of trans, trans methyl 3-methyl-7-ethyl-11-oxotrideca-2,6-dienoate and 2 ml. of ethane-dithiol, cooled in ice-bath, is added two drops of borontrifluoroetherate. After one hour at 0°, cold aqueous sodium hydroxide is added and the mixture extracted with ether. The ethereal phase is washed with aqueous sodium hydroxide and sodium chloride, dried and evaporated to yield the cycloethylene thioketal of trans, trans methyl 3-methyl-7-ethyl-11-oxotrideca-2,6-dienoate.

EXAMPLE 8

A mixture of 1 g. of trans, trans methyl 3-methyl-7-ethyl-11-oxotrideca-2,6-dienoate, 9 g. of 1,2-ethanediol, a few crystals of p-toluenesulfonic acid monohydrate and 50 ml. of dry benzene in Dean-Stark apparatus is refluxed overnight. After cooling, 0.2 ml. of pyridine is added and then ether. The mixture is washed with water and brine and the organic phase dried over sodium sulfate and evaporated under reduced pressure to yield trans, trans methyl 3 - methyl - 7 - ethyl-11,11-cycloethylenedioxy-trideca-2,6-dienoate.

EXAMPLE 9

A mixture of 90 mg. of trans, trans ethyl 3-methyl-7-ethyl-11-methoxytrideca-2,6-dienoate and 2% perchloric acid in tetrahydrofuran-water (4:1) is stirred about five minutes. The mixture is poured into 5% aqueous potassium bicarbonate solution and extracted with ether. The ether extracts are washed with water and saturated brine, dried over sodium sulfate and evaporated to yield trans, trans ethyl 3 - methyl - 7-ethyl-11-oxotrideca-2,6-dienoate which is purified by preparative thin-layer chromatography eluting with hexane-ethyl acetate (85:15).

Using the above procedure, the other enol ethers of Formula V are converted into the corresponding 11-oxo compounds of Formula IX (R′ is oxygen atom), e.g. each of trans, trans methyl 3,7-dimethyl-11-methoxytrideca-2,6,10-trienoate and trans, trans ethyl 3,7-dimethyl-11-methoxytrideca-2,6,10-trienoate is converted into trans, trans methyl 3,7-dimethyl-11-oxotrideca-2,6-dienoate and trans, trans ethyl 3,7-dimethyl-11-oxotrideca-2,6-dienoate, respectively. By use of the procedures of Examples 7 and 8, the 11-oxo compounds are converted into the corresponding cycloethylene thioketals and cycloethylene ketals.

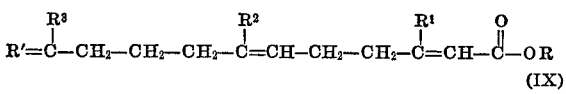

(IX)

In the above Formula IX, each of R, $R^1$, $R^2$, $R^3$ is as defined above and R′ is oxygen atom, cycloethylenedioxy or cycloethylenedithio. The compounds of Formula IX are useful insect control agents. For convenience, they are ordinarily used in conjunction with a suitable inert carrier, liquid or solid. The compounds (IX) are effective agents for the control of members of Pyrrhocoridae, Miridae, Lygaeidae, Pyralidate and Coleoptera, such as Pyrrochoris, Dysdercus, Galleria, Plodia, Phtorimoea and Tribolium. Preferably, the active compound is applied to the immature insect at the embryo, larvae or pupae stage. The compounds are generally applied at a level of about 0.1 to 25 micrograms per insect. The compounds (IX) are effective control agents by reason of their ability to disrupt normal metamorphic development causing abnormal development and, in some cases, sterility or inability to reproduce.

What is claimed is:

1. A compound selected from those of the following formula:

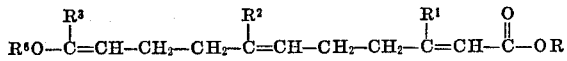

wherein,
R is lower alkyl, and each of $R^1$, $R^2$, $R^3$ and $R^6$ is lower alkyl.

2. A compound according to claim 1 wherein the configuration at C–2,3 and C–6,7 is trans.

3. A compound according to claim 2 wherein each of R, $R^1$, $R^2$, $R^3$ and $R^6$ is methyl or ethyl.

4. A compound according to claim 3 wherein $R^1$ is methyl and $R^3$ is ethyl.

5. The compound, methyl 3 - methyl-7-ethyl-11-methoxytrideca-2,6,10-trienoate, according to claim 2.

6. The compound, ethyl 3 - methyl-7-ethyl-11-methoxytrideca-2,6,10-trienoate, according to claim 2.

7. The compound, methyl 3,7-dimethyl-11-methoxytrideca-2,6,10-trienoate, according to claim 2.

8. The compound, ethyl 3,7-dimethyl-11-methoxytrideca-2,6,10-trienoate, according to claim 2.

9. The compound, methyl 3-methyl-7-ethyl-11-ethoxytrideca-2,6,10-trienoate, according to claim 2.

References Cited

Pattenden et al.: J. Chem. Soc. (C), No. 16 (1968), pp. 1984, 1988 and 1996–7 relied upon.

LEWIS GOTTS, Primary Examiner

D. G. RIVERS, Assistant Examiner

U.S. Cl. X.R.

260—327 M, 340.5, 348 A, 408, 485 R, 606.5 F; 252—522, 56 S; 424—278, 312